United States Patent
Reihle et al.

(10) Patent No.: US 8,573,850 B2
(45) Date of Patent: Nov. 5, 2013

(54) SUPPORT ARRANGEMENT FOR THE AXIALLY AND RADIALLY YIELDING SUPPORT OF A SHAFT BEARING

(75) Inventors: Joachim Reihle, Schnaitsee (DE); Hans Oberstarr, Polling (DE)

(73) Assignee: SGF Sueddeutsche Gelenkscheibenfabrik GmbH & Co. KG, Waldkraiburg (DE)

( * ) Notice: Subject to any disclaimer, the term of this patent is extended or adjusted under 35 U.S.C. 154(b) by 372 days.

(21) Appl. No.: 12/933,275

(22) PCT Filed: Mar. 18, 2009

(86) PCT No.: PCT/EP2009/002006
§ 371 (c)(1),
(2), (4) Date: Nov. 9, 2010

(87) PCT Pub. No.: WO2009/115316
PCT Pub. Date: Sep. 24, 2009

(65) Prior Publication Data
US 2011/0091142 A1    Apr. 21, 2011

(30) Foreign Application Priority Data
Mar. 18, 2008  (DE) .......................... 10 2008 014 666

(51) Int. Cl.
*F16C 27/00*    (2006.01)
*B60K 17/24*    (2006.01)

(52) U.S. Cl.
USPC ......................................... 384/536; 180/381

(58) Field of Classification Search
USPC ........... 384/99, 119, 215, 534, 535, 536, 537, 384/581, 582, 611, 612, 620; 180/381, 382; 248/637, 674
See application file for complete search history.

(56) References Cited

U.S. PATENT DOCUMENTS

| | | | |
|---|---|---|---|
| 2,563,980 A | 8/1951 | Wahlberg | |
| 2,618,520 A | 11/1952 | Anderson et al. | |
| 3,325,230 A | 6/1967 | Caunt | |
| 3,365,032 A | 1/1968 | Gorndt | |

(Continued)

FOREIGN PATENT DOCUMENTS

| | | |
|---|---|---|
| DE | 1425073 | 12/1968 |
| DE | 1625537 | 2/1972 |

(Continued)

OTHER PUBLICATIONS

European Patent Office, International Search Report, PCT/ISA/220, PCT/ISA/210, PCT/ISA/237, Jul. 17, 2009.

*Primary Examiner* — Thomas R Hannon
*Assistant Examiner* — Adam D Rogers
(74) *Attorney, Agent, or Firm* — Wood, Herron & Evans, LLP

(57) ABSTRACT

The invention relates to a support arrangement for the yielding support of a shaft bearing, having a radial inner support ring, into which the shaft bearing can be installed, and having a bearing housing for fixing the support arrangement. The radial inner support ring is connected to the bearing housing via a connection structure such that the radial inner support ring can be deflected from an initial position relative to the bearing housing with respect to a central axis of the shaft bearing both in the axial and radial directions from a starting position. The deflection delimitation device delimits the axial deflection of the radial inner support ring relative to the hearing housing in the axial direction.

7 Claims, 14 Drawing Sheets

(56) References Cited

U.S. PATENT DOCUMENTS

| | | | |
|---|---|---|---|
| 3,415,500 A | | 12/1968 | Pethis |
| 4,639,150 A | | 1/1987 | Habermann |
| 4,722,618 A | * | 2/1988 | Matsumoto et al. ......... 384/536 |
| 5,161,903 A | * | 11/1992 | March ........................ 384/536 |
| 5,551,783 A | | 9/1996 | Whitney et al. |
| 5,829,892 A | | 11/1998 | Groves |
| 6,379,048 B1 | * | 4/2002 | Brissette ..................... 384/202 |
| 6,960,024 B2 | * | 11/2005 | Robb et al. .................. 384/536 |
| 7,044,646 B1 | * | 5/2006 | Aiken et al. ................. 384/536 |
| 2002/0131660 A1 | * | 9/2002 | Bade et al. .................. 384/536 |
| 2002/0172442 A1 | * | 11/2002 | Bade et al. .................. 384/536 |

FOREIGN PATENT DOCUMENTS

| | | |
|---|---|---|
| DE | 2237319 | 9/1973 |
| DE | 3128619 A1 * | 4/1982 |
| DE | 3511480 | 6/1986 |
| DE | 3832543 | 4/1990 |
| DE | 4139923 | 7/1992 |
| DE | 4340607 | 6/1994 |
| DE | 4320642 | 1/1995 |
| DE | 19609591 | 8/1997 |
| DE | 10213595 | 10/2002 |
| DE | 102004006490 | 4/2005 |
| GB | 155165 | 12/1920 |
| WO | WO 2005078293 A1 * | 8/2005 |

* cited by examiner

SUPPORT ARRANGEMENT FOR THE AXIALLY AND RADIALLY YIELDING SUPPORT OF A SHAFT BEARING

This application claims priority to, and/or is a continuation of International Application No. PCT/EP2009/002006, filed on Mar. 18, 2009 and German Application No. 10 2008 014 668.8, filed on Mar. 18, 2008.

FIELD OF THE INVENTION

The present invention relates generally to a support arrangement for the yielding support of a shaft bearing, and more specifically to a support arrangement configured to limit the axial deflection of shaft bearing components.

BACKGROUND OF THE INVENTION

Up to now, torques in motor vehicles have been transmitted e. g. by two-piece articulated shafts which are connected with each other via a splined shaft in an non-positive torque-transmitting connection. For the radial guidance and mounting of these shafts, support arrangements of the type as disclosed e. g. in the German Patent Specification DE 10 2004 006 490 B3 have been used. In shaft bearings with support arrangements of the above type, very long distances in the axial direction occur which are caused by the axial locking effect of the splined shaft arrangement or/and by unit movements. Axial deflections of up to 15 mm may result. The support arrangements of the type described in the mention patent specification were therefore designed in such a manner that they do not limit the deflections in the axial direction, but only provide for the radial guidance and the damping of radial deflections of the shafts.

In the course of developments in the field of torque transmission between two shaft portions, in particular, in the area of the drive train of motor vehicles, the requirements for a support arrangement for a shaft bearing have changed considerably by the use of axial ball guides, so-called "ball splines". The use of axial ball splines enables the connection of two shaft portions by a "floating" bearing unit, which achieves a marked reduction of the forces acting in the axial direction. Because of the floating bearing of the shaft connection, a totally rigid design of a shaft bearing with a support arrangement would be theoretically conceivable, i. e. without any axial clearance. A totally rigid arrangement, however, leads to a high noise generation, e. g. by the transmitted structure-bone sound accompanied by a deterioration of the acoustic properties. In particular in the field of vehicle engineering, however, high importance is attached to the acoustic properties of individual components.

SUMMARY OF THE INVENTION

On the basis of the initially described problem, it is the objective of the present invention to provide a support arrangement for the support of a shaft bearing, which prevents or at least minimizes the transmission of structure-borne sound and at the same time limits the axial deflections of the shaft bearing.

This objective is solved by a support arrangement of the initially mentioned kind, wherein deflection-delimiting features are provided which limit the axial deflection of the radial inner support ring relative to the bearing housing in the axial direction.

By the initially described advancements in the field of mounting a two-piece articulated shaft and the associated novel requirements for a support arrangement, it is necessary to allow a certain axial deflection for acoustic reasons. Due to the fact, however, that because of the essentially floating bearing by the torque-transmitting ball splines high axial forces are no longer transmitted, the axial deflection may be limited or reduced by stop features which counter the axial deflection by a counterforce.

In this context, a development of the invention provides for the connecting structure to comprise a connecting body of a rubber elastic material which connects the inner support ring elastically deflectable in the radial direction with an outer support ring. Due to the connecting body, which is advantageously formed as a folding diaphragm, vibrations in the axial and radial direction may be attenuated, on the one hand and, on the other hand, the floating bearing unit with ball splines and shaft bearing may be returned into its neutral position by the reset force of the connecting body, in which it comprises predetermined acoustic properties.

Concerning the design, there are several different possibilities for limiting the axial deflection of the radial inner support ring relative to the bearing housing. An embodiment of the invention provides for a deflection-delimiting feature to comprise at least one stop portion which protrudes towards the central axis of the shaft bearing, which is arranged on at least one side of the bearing housing, and that the connecting structure, in particular the connecting body or the radial inner support ring, is adapted to contact the stop portion of the bearing housing upon an axial deflection. In this context, it remains to be noted that axial deflections or axial vibrations, respectively, may occur not only in one axial direction (e. g. by decelerations or accelerations), so that according to an advantageous embodiment, at least one stop portion is provided on both sides of the bearing housing.

In order to be able to effectively limit the axial deflections of the inner support ring relative to the bearing housing, the connecting body has to be constructed for cooperation with the stop portions on the bearing housing. For this purpose, a development of the invention provides for at least one stop surface to be formed on the connecting body, which may be brought in contact with the at least one stop portion of the bearing housing. In this context it should be mentioned that the support of the stop surfaces against the at least one stop portion may take place progressively. A support in the radial direction of the stop surface of the connecting body at the radial outer support ring is also possible. This support in the radial direction, too, may be designed with a progressive characteristic.

With respect to the geometry of the at least one stop surface of the connecting body, it may be formed circumferentially or divided into segments. With respect to the geometry of the stop portions of the bearing housing it remains to be mentioned that the stop portions are formed as radial protrusions which are arranged in preferably regular angular distance. In this context, a development of the invention preferably provides for the stop surfaces of the connecting body in a segmented configuration to align these to the radial protrusions of the bearing housing.

In order to keep the influence on the radial characteristic of the support arrangement as low as possible, even with the rubber elastic stop surfaces of the connecting body contacting the at least one stop portion of the bearing housing, a development of the invention provides a sliding ring or sliding elements of the connecting body or/and the radial inner support ring on its stop surfaces, which is/are formed for a low-friction cooperation with the at least one stop portion.

As already mentioned, there are several constructional possibilities for limiting the axial deflection of the radial inner support rings relative to the bearing housing. A development of the invention provides for the deflection-delimiting feature to comprise at least one spring element between the bearing housing and the radial inner support ring, which counteracts an axial deflection of the radial inner support ring. In this embodiment, a counter force which is obtained by the deformation of the spring element therefore counteracts the axial deflection.

In order to be able to limit the axial deflection as desired, an embodiment of the invention provides for the at least one spring element to bear against one stop portion of the bearing housing with one end and with the other end against a support surface of the connecting body. As already mentioned above, axial deflections or vibrations, respectively, do not occur in only one axial direction. With this solution, it is therefore also advantageous to arrange spring elements on both sides of the radial inner support ring. For the described application, it is advantageous in this context that the at least one spring element is formed by an elastic body such as a rubber buffer, or a helical compression spring, or a spiral compression spring. Furthermore, it may also provided in this context to insert the spring elements each into an integral pocket at the connecting body or to surround them by a bellow-like rubber diaphragm or rubber sleeve, and to tightly fix them at the bearing housing and/or at the radial outer support ring in a positive or non-positive manner. The rubber diaphragm or the rubber sleeve, respectively, may be formed integrally with the connecting body or as a separate component which may be attached subsequently at the radial inner or/and outer support ring in a non-positive or positive manner.

Another constructional possibility to limit the axial deflection of the radial inner support ring relative to the bearing housing is that the connecting structure comprises connecting webs between the bearing housing and radial inner support ring, which form the deflection-delimiting feature, which are deformable upon an axial deflection of the radial inner support ring relative to the bearing housing, while generating a counter force which counteracts the deflection. In this variant, the connecting structure itself is configured in such a manner that it counteracts the axial deflection.

In order to limit the axial deflection of the shaft bearing and to thereby maintain the centre area of the articulated shaft within predetermined deflections a development of the invention in this context provides for the connecting webs to be preferably arranged at regular angular distances between the bearing housing and the radial inner support ring and oriented inclined or askew relative to the central axis of the shaft bearing. Depending on the inclination relative to a vertical plane, the inclined or askew orientation provides for more or less high counter forces against an axial but also a radial deflection. The geometry and the number of webs are also influencing the amount of the counter forces.

In order to keep the assembly expenditure for the inventive support arrangement as low as possible, an embodiment of the invention provides for the bearing housing to be formed in a single-piece or multi-piece, in particular, in a two-piece configuration, with the division being made in a plane which contains the axis or extends orthogonally to it.

As already explained above in detail, the invention limits the axial deflections of the inner support ring. It must be taken into account, however, that for different applications or for different motor vehicle type, respectively, and here in particular for the drive train of the motor vehicle, different axial deflections may be allowed. Further, the support arrangement has to be matched with the dimensioning of the individual shaft components as well as with the occurring loads. A development of the invention therefore provides for the adjustment of the axial deflection of the radial inner support rings relative to the bearing housing if required.

Further, the invention relates to a drive train for a motor vehicle with an inventive support arrangement of the above described type.

BRIEF DESCRIPTION OF THE DRAWINGS

In the following, the invention will be explained by way of example with reference to the accompanying figures in which.

Figure 1:
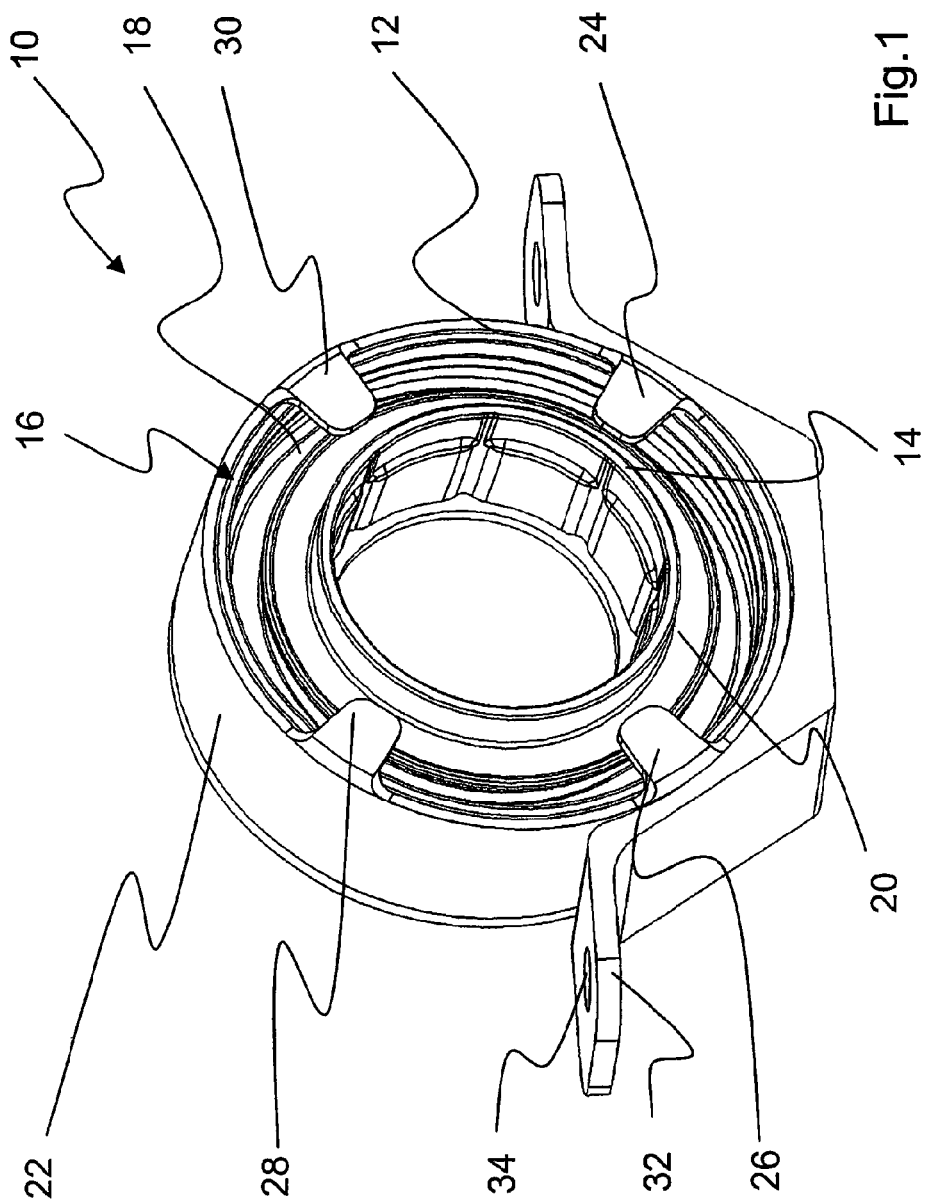
FIG. 1 shows a perspective view of a first embodiment of an inventive support arrangement.

The support arrangement according to the first embodiment of the invention is shown in FIG. 1 and generally identified by 10. It is intended for the axially and radially yielding support of a commercially available roller (shaft) bearing (shown as element 11 in FIG. 3 in phantom). The support arrangement 10 includes a radial outer support ring 12 and a radial inner support ring 14. For the application, e. g. in a drive train of a motor vehicle, the roller bearing 11 is accommodated in the support ring 14. Both support rings 12, 14 are preferably made from metal or similar stable materials and are connected with each other by a rubber elastic connecting body 16. The connecting body 16 has the shape of a folding diaphragm with a fold 18.

Further, a bearing housing 22 can be seen in FIG. 1 with stop portions 24, 26, 28, 30 which protrude in the direction of the inner support ring 14, and which are adapted to come into contact with a stop surface 20 of the connecting body 16 in the case of an axial deflection, to thereby limit the axial deflection.

FIG. 1 also shows that the bearing housing 22 is secured at a lower half 32 of a mounting device, preferably by welding.

The lower half 32 is associated with an upper half (not shown) of the mounting device, which may, e. g. be part of a floor assembly of a motor vehicle. The half 32 together with the not shown half of the mounting assembly form a housing for accommodating the support arrangement 10, and are preferably screw-connected with one another via screw holes 34 indicated in FIG. 1.

Figure 2:
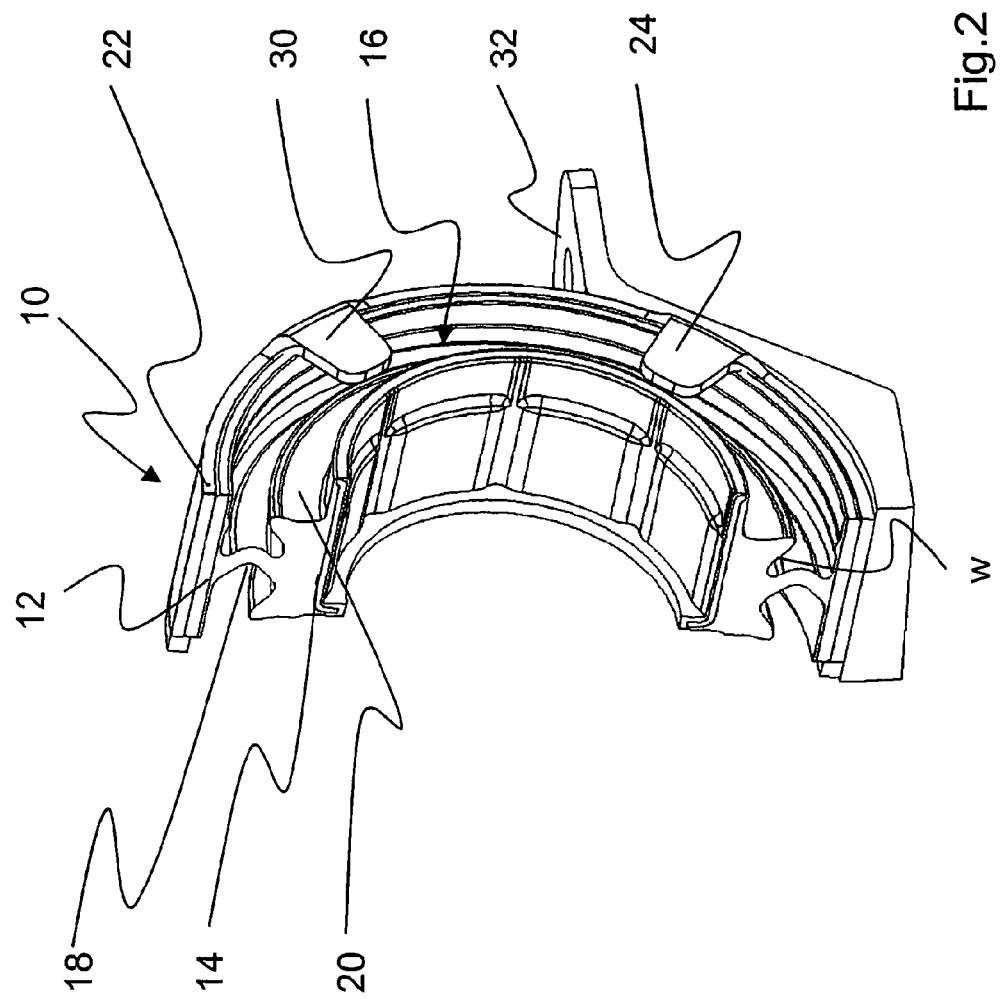
FIG. 2 shows a perspective sectional view which is sectioned in the plane containing the axis of the first embodiment of the invention.

FIG. 2 shows a perspective sectional view according to the first embodiment of invention. From FIG. 2 it can be seen more clearly how the outer support ring 12 and the inner support ring 14 are connected by the connecting body 16 with its fold 18 so as to be mutually movable axially and radially. FIG. 2 also shows that the stop portions, only 24 and 30 being shown herein, are axially spaced from the stop surface 20 of the connecting body 16. The axial distance between the stop surface 20 and the stop portions 24, 30 approximately corresponds to the maximum permissible axial deflection of the inner support ring 14 relative to the outer support ring 12, if the elastic deformation of the connecting body 16 is not taken into consideration. As soon as the stop surface 20 contacts the stop portions 24, 30 the axial deflection will thereby be limited by the stop portions 24, 30 of the bearing housing 22. Depending on the motor vehicle type or the scope of application, the maximum deflection may be designed to be smaller or larger.

Another adjustment possibility is provided by the fold 18 of the connecting body 16. By its geometric design and the material thickness, the fold 18 may decisively influence the elastic properties and the isolation of the generated noise. Furthermore, the negative effects on the radial properties as well as on the life of the support arrangement 10 may be minimized by limiting the axial deflection of the inner support ring 14. Relative to the central axis A (FIG. 3) of the shaft bearing, the deflections orthogonally to the axis are also limited. This is achieved in that the connecting body 16 with its stop surfaces 20 contacts the radial outer support ring 12 upon a known radial deflection and bears against it. The stop function in the radial and axial direction may be progressive. With this novel concept for mounting a two-piece articulated shaft, the fold 18 performs an additional task in that it provides for the floating bearing unit (not shown) to be returned in the direction of its neutral position after an axial deflection by using its reset force which also counteracts axial and radial deflections.

During operation of the support arrangement 10 in a two-piece articulated shaft (not shown) with axial ball splines, i. e. of a drive train of a motor vehicle, the inner support ring 14 may be deflected relative to the outer support ring 12 in the axial direction until it hits the stop portions 24, 30 after the maximum permissible deflection. The stop surfaces 20 of the connecting body 16 are shaped in such a manner that upon the axial hit at the stop portions 24, 30 a progression results which ensures an acoustically advantageous behaviour even in a hit situation. In FIG. 2, a recessed curved portion w may be seen between the fold 18 and the stop surface 20, which in the hit situation permits a higher resilience or further folding, respectively, which is advantageous in terms of acoustics. This means concretely that upon an axial hit, the inner support ring 14 may be further deflected within a small degree, with the connecting body 16 progressively folding.

Figure 3:
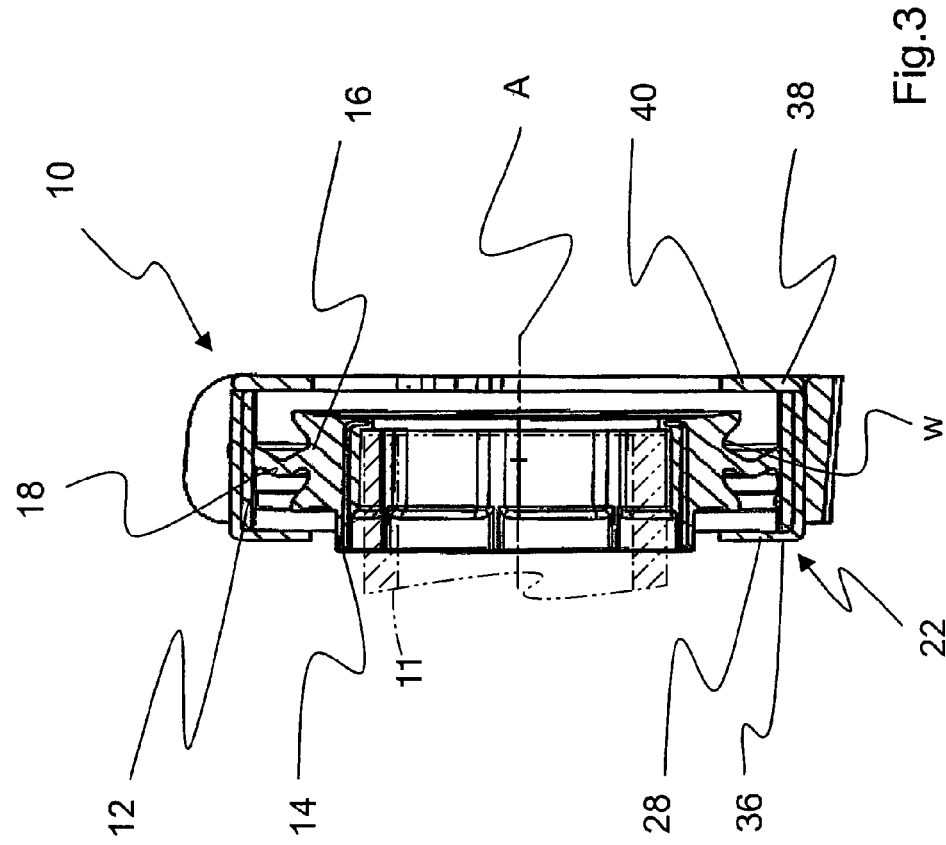
FIG. 3 shows a sectional view according to the first embodiment of the invention.

FIG. 3 shows a sectional view of the inventive support arrangement 10 with a connecting body 16, which comprises the fold 18, which connects the outer radial support ring 12 and the inner radial support ring 14. The bearing housing 22 according to this embodiment is formed as a two-piece housing, with a part 36 which is in radial engagement with the outer support ring 12, and which comprises the stop portion 28, and an end part 38 which is removable in the axial direction, and which comprises the stop portion 40.

It can be seen from FIG. 3 that the stop surfaces may hit the stop portions 28, 40 which protrude in the direction of axis A only approximately to their centers. The curved recess w between the fold 18 and the stop surfaces 20 is visible again. The curved recess w enables a progression in the axial direction, i. e. small deflections or vibrations, respectively, of the connecting body 16 are still possible, even in the contact position, so that an acoustically advantageous folding operation which proceeds stepwise is still possible.

In the following, a second variant of the first embodiment of the invention, which includes a bearing housing which is split in a plane containing the axis will be explained with reference to FIGS. 4 and 5. The same reference numerals are used for components with the same effect or with similar configuration.

Figure 4:
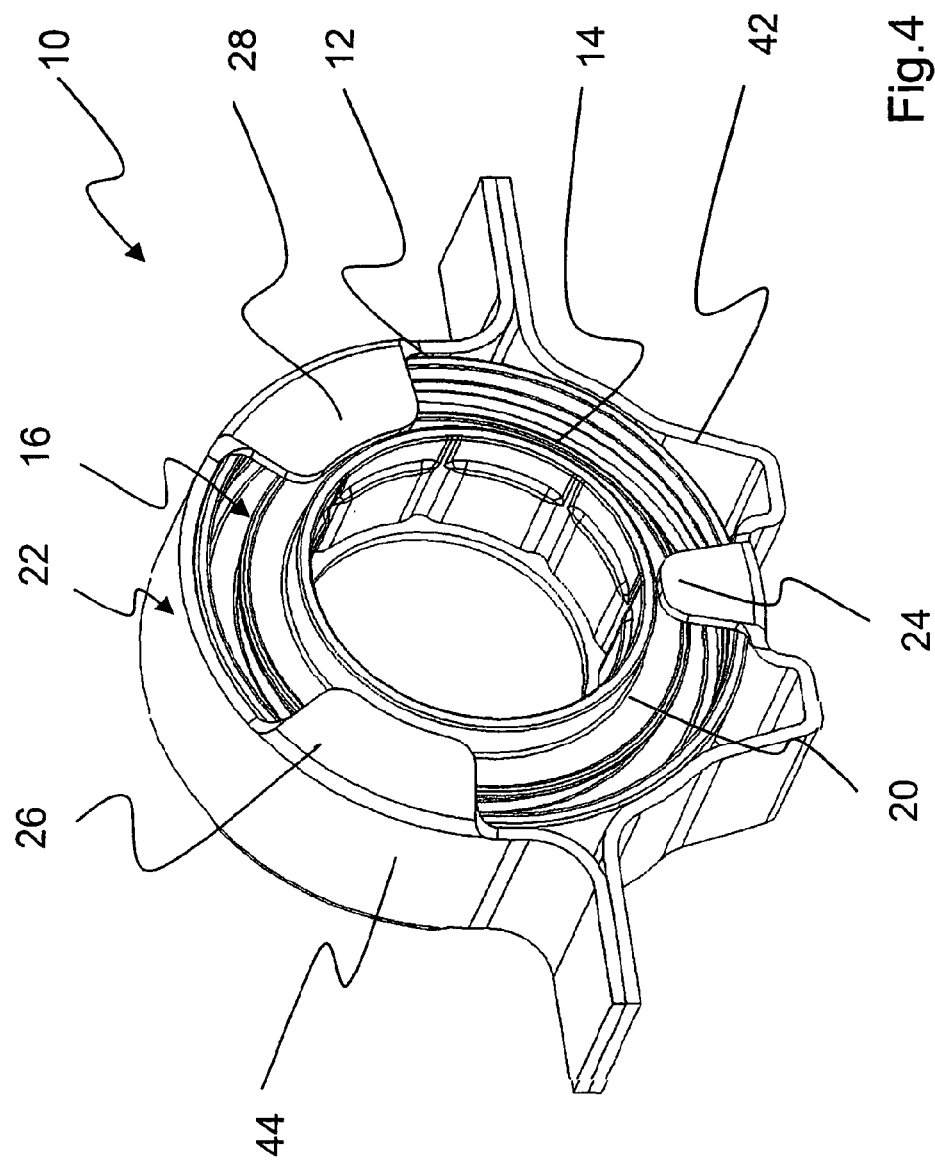
FIG. 4 shows a perspective view of the first embodiment of the invention with a two-piece bearing housing.

FIG. 4 shows a perspective view of a second variant of the first embodiment of the invention, which differs from the first variant according to FIGS. 1 to 3 only in that the bearing housing 22 is formed as a two-piece component. Consequently, the bearing housing 22 includes a lower housing half 42 and an upper housing half 44. The two housing halves 42 and 44 thus accommodate the connecting body 16 with the outer radial support ring 12 and the inner radial support ring 14. The stop portions 28 and 26 are arranged on the upper housing half 44, while the stop portion 24 is arranged on the lower housing half 42. The two housing halves 42 and 44 may be permanently connected with each other, in particular welded, riveted or screw-connected. Such a configuration of the bearing housing is advantageous for the assembly. The two housing halves 42 and 44 may be pre-manufactured separately from the connecting body 16 which has only to be inserted into one of the housing halves 42 or 44 in the final assembly, and then the two halves 42 and 44 have to be connected with each other.

Figure 5:
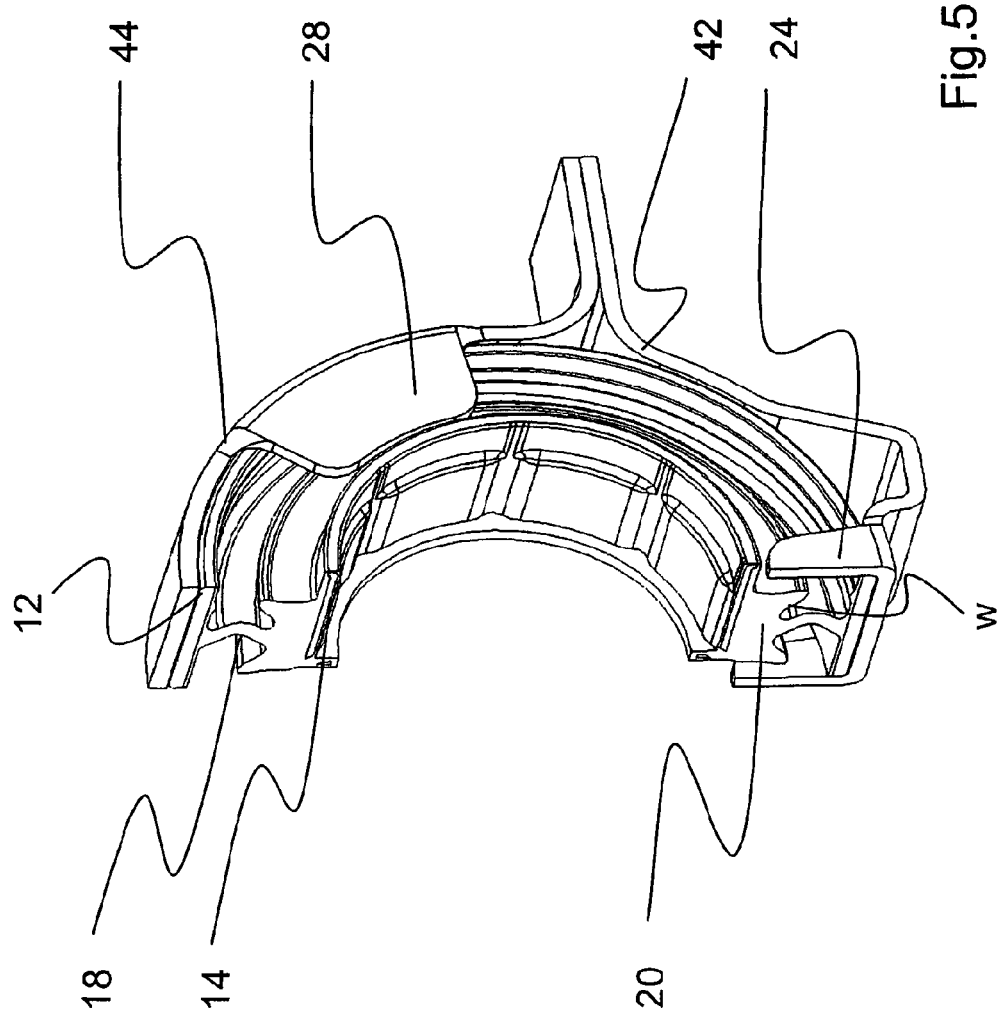
FIG. 5 shows a perspective sectional view which is sectioned in the plane containing the axis of the first embodiment of the invention with a two-piece bearing housing.

FIG. 5 shows a sectional perspective view of the second variant of the first embodiment of the invention.

In the following, a third variant of the first embodiment of the invention will be explained with reference to FIGS. 6 and 7. The same reference numerals as in the first two variants are used for components with the same effect or with similar configuration.

Figure 6:
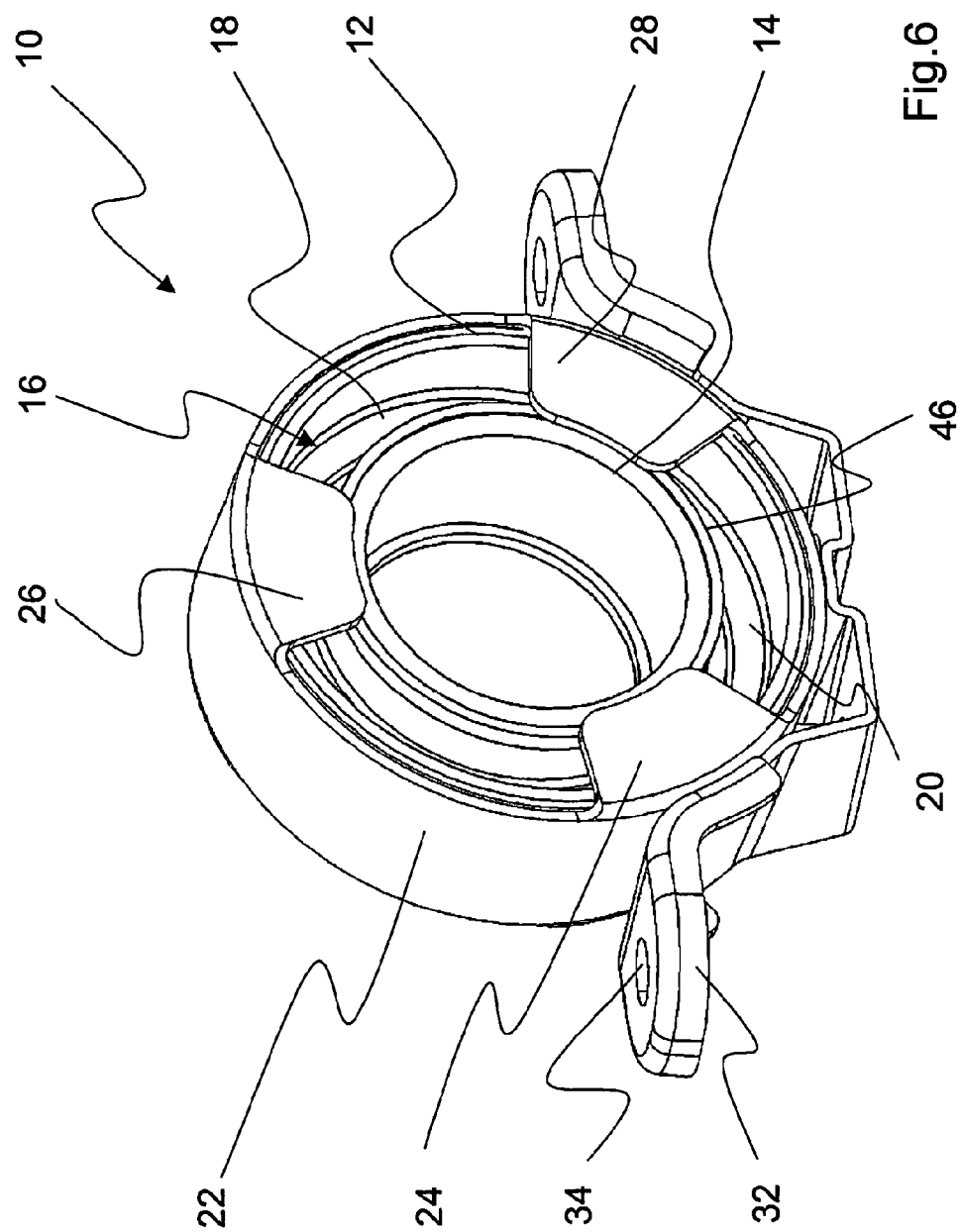
FIG. 6 shows a perspective view of the first embodiment of the invention with sliding rings.
Figure 7:
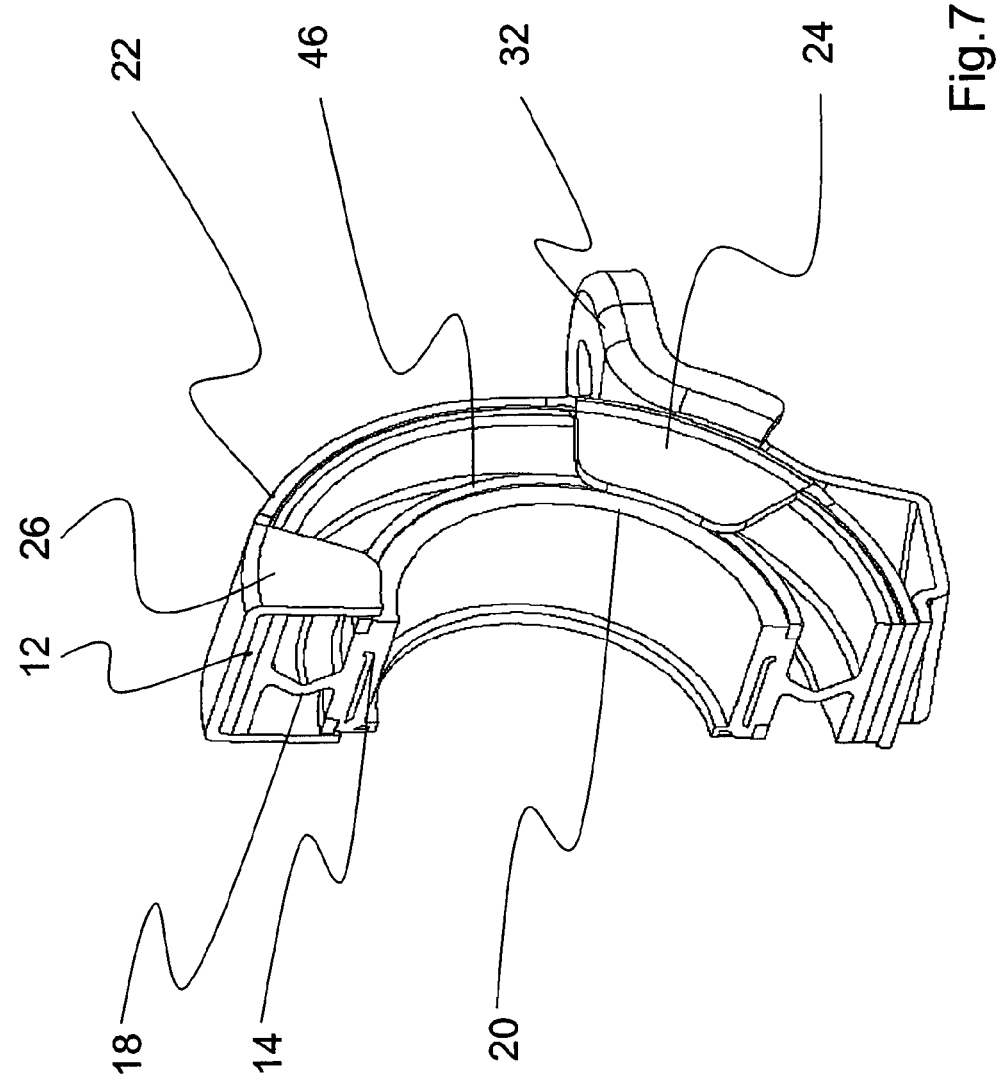
FIG. 7 shows a perspective sectional view which is sectioned in the plane containing the axis of the first embodiment of the invention with sliding rings.

The variant according to FIGS. 6 and 7 differs from the above described variant of the first embodiment according to FIGS. 1 to 3 only in that the connecting body 16 includes a sliding ring 46 on its stop surface 20. Even with the stop surfaces of the connecting body 16 being in contact with the stop portions 24, 26, 28, the radial characteristic of the rubber elastic connecting body 16 is hardly influenced because of the sliding ring 46. Furthermore, in a hit situation the friction between the sliding ring 46 and the stop portions 24, 26 and 28 will be kept as low as possible by the preferably Teflon-coated sliding ring.

FIG. 7 again shows a sectional perspective view of the third variant of the invention, in which the sliding ring 46 can be seen.

In the following, a second embodiment of the invention will be explained with reference to FIGS. 8 and 9. The same reference numerals as in the first embodiment are used for components with the same effect or with similar configuration as in the first embodiment, however, preceded by the number "1".

Figure 8:
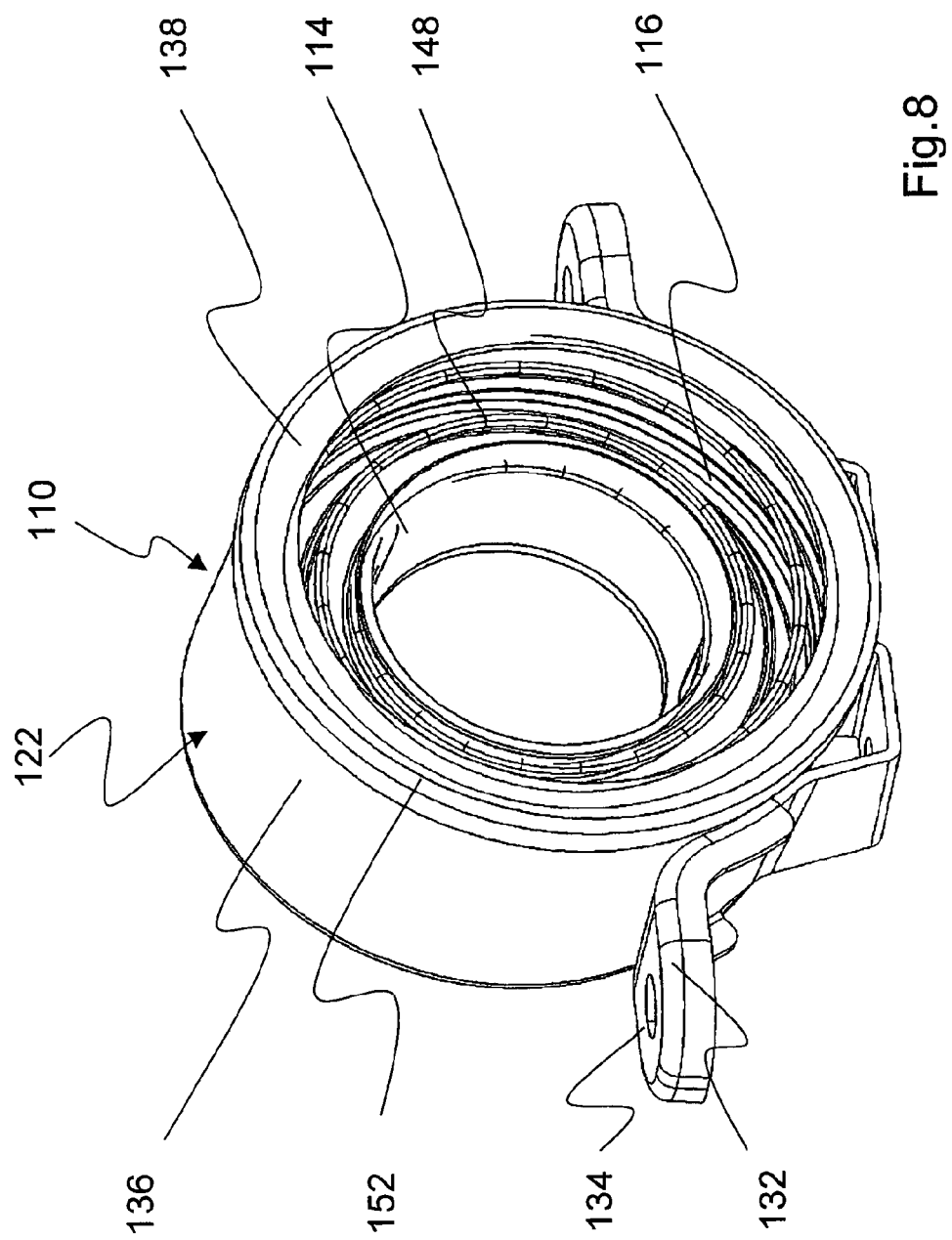
FIG. 8 shows a perspective view if a second embodiment of the invention.
Figure 9:
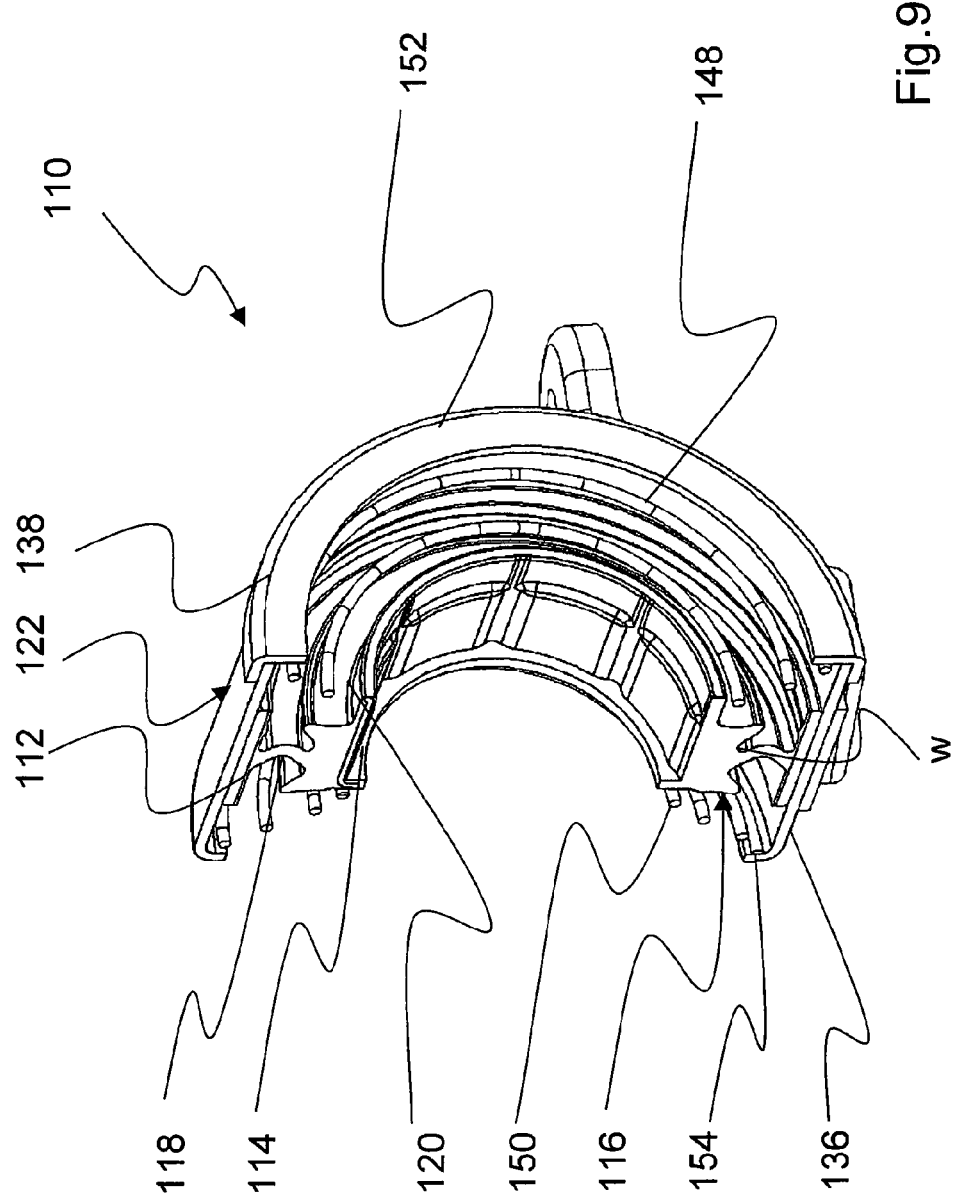
FIG. 9 shows a perspective sectional view which is sectioned in the plane containing the axis of the second embodiment of the invention.

In the embodiments according to FIGS. 8 and 9, the axial deflection of the radial inner support ring 114 relative to the bearing housing 122 is limited not by axial stops at the bearing housing as in the first embodiment, but with spring elements (in FIG. 8 only spring element 148 is shown) which are arranged on both sides. As can be seen from FIG. 8, the spring 148 contacts the connecting body 116 with its one end and the contact surface 152 which is formed at the housing end part 138 with its other end.

From FIG. 9, the two springs 148 and 150, preferably helical springs, may be seen which with their smaller diameters contact a contact surface 120 of the connecting body 116 and with their larger diameters contact the contact surfaces 152 and 154 of the bearing housing. FIG. 9 also shows that the connecting body 116 according to this second embodiment is also provided with a fold 118 which, depending on the scope of application or the requirement for noise compensation, may be configured is with a greater or smaller buckling angle. FIG. 9 shows the two-piece configuration of the bearing housing 122 with the housing end part 138 which is removable in the axial direction, and the housing part 136 which is in engagement with the radial outer support ring 112.

During operation of the support arrangement 110, the springs 148, 150 have a similar effects as the stops according to the first embodiment, with the difference that the springs 148, 150 due to being depressed, immediately counteract an axial deflection or vibrations, respectively, whereby the spring resistance increases progressively, i. e. the greater the deflection, the higher the counter force will be which is applied by the springs 148, 152.

Contrary to the embodiment described with reference to FIGS. 1 to 7, the inner support ring 114 or the connecting body 116, respectively, according to this embodiment does not have an axial deflection range within which only the reset force of the fold 118 occurs as a counter force, because here the springs 148, 150 immediately counteract the deflection. The arrangement of springs 148, 150 generates new adjustment possibilities for the respective application or different designs of drive trains, respectively, in various vehicle types, because springs may be used with varying characteristics, depending on type and dimensioning. It should be added here, that the embodiment according to FIGS. 8 and 9 is returned very rapidly by the springs 148 and 150 into its neutral position after a deflection, in which it includes very good radial properties, because the springs 148 and 150 counteract deflections and vibrations in both sides.

The assembly of a floating bearing unit with axial ball splines is simplified by the inventive support arrangement according to this embodiment, because the springs 148, 150 assume their neutral position "automatically" by the spring forces of the springs 148, 152, which act in the opposite directions, so that no comprehensive measurements for the determination of the neutral position of the bearing unit have to be carried out.

In the following, a third embodiment of the invention will be described with reference to FIGS. 10 and 11. The same reference numerals as in the first embodiment are used for components with the same effect or with similar configuration as in the first embodiments which were already described, however, preceded by the number "2".

Figure 10:
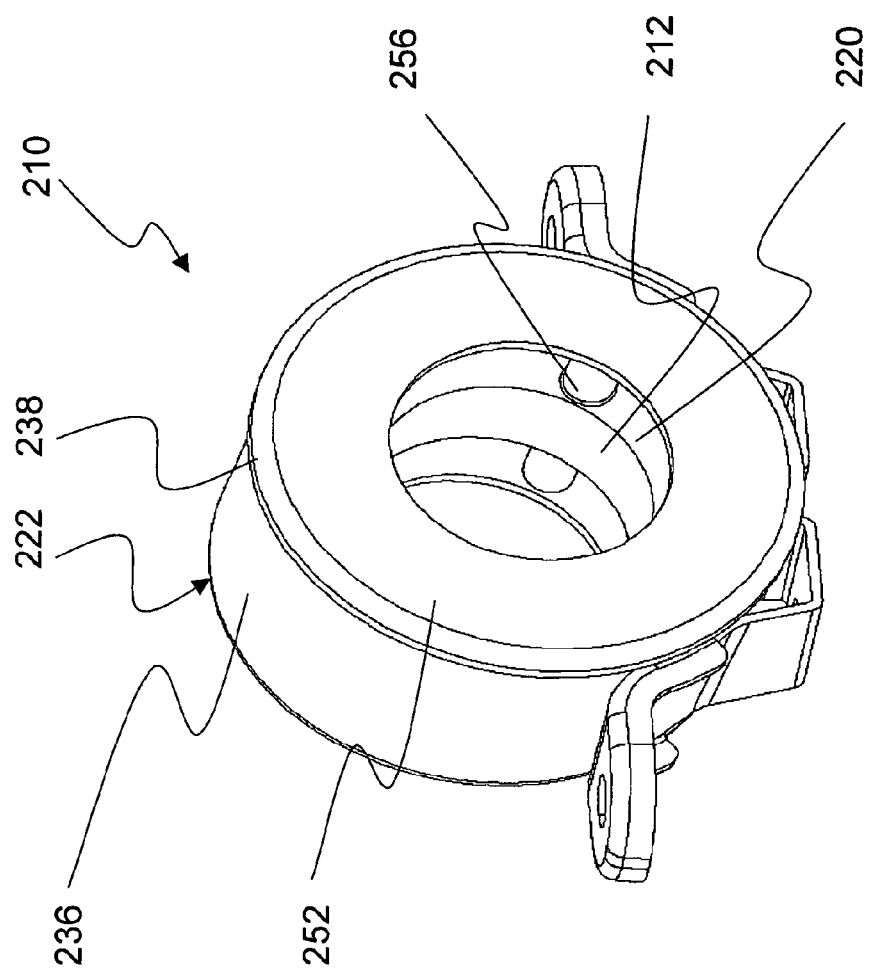
FIG. 10 shows a perspective view of a third embodiment of the invention.

In this embodiment as shown in FIG. 10, rubber elastic bodies 256 are arranged between the contact surface 220 of the connecting body 216 and the contact surface 252 at the housing end part 238.

Figure 11:
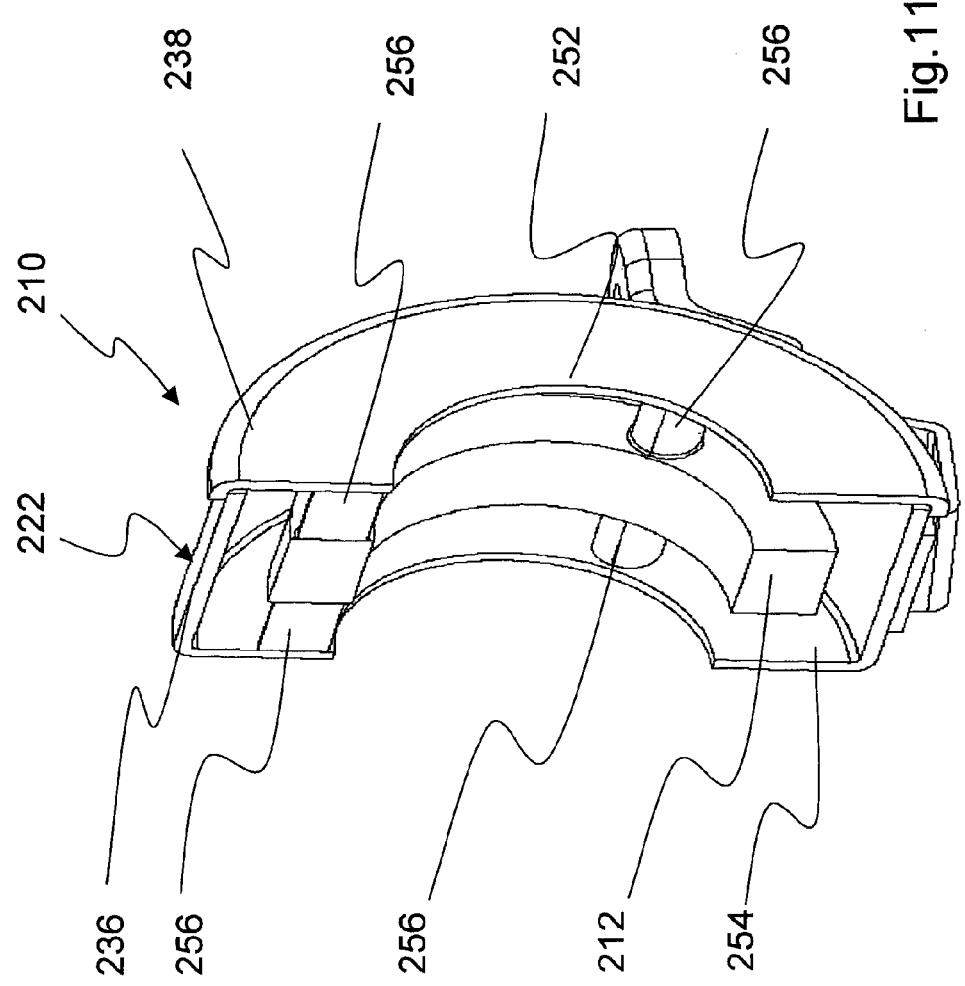
FIG. 11 shows a perspective sectional view which is sectioned in the plane containing the axis of the third embodiment.

According to FIGS. 10 and 11, no connecting body with a fold is provided. Instead, rubber elastic bodies 256 are provided which are connected with the bearing housing 222. I can be seen from FIG. 11 that the rubber elastic bodies 256 are arranged on both sides of the radial inner support ring 214 at its contact surfaces 220, each of which bearing against the annular contact portions 252 and 254 of the bearing housing 222 or even being secured at them, e. g. by a rivet connection. The rubber elastic bodies 256 are again preferably arranged at uniformly distributed angular distances in order to obtain force-symmetric properties. Like the springs of the second embodiment, the rubber elastic bodies 256 counteract an axial and radial deflections or vibrations, respectively, immediately upon the occurrence if these deflections or vibrations, and also have a progressive characteristic, i. e. an increasing resistance with increasing deflections. From FIG. 11 it may also be seen that the bearing housing is a two-piece component is this embodiment as well.

A fourth embodiment of the invention will now be described with reference to FIGS. 12 and 13, wherein components with the same effect or with similar configuration are identified by the same reference numerals which are, however, preceded by the number "3".

Figure 12:
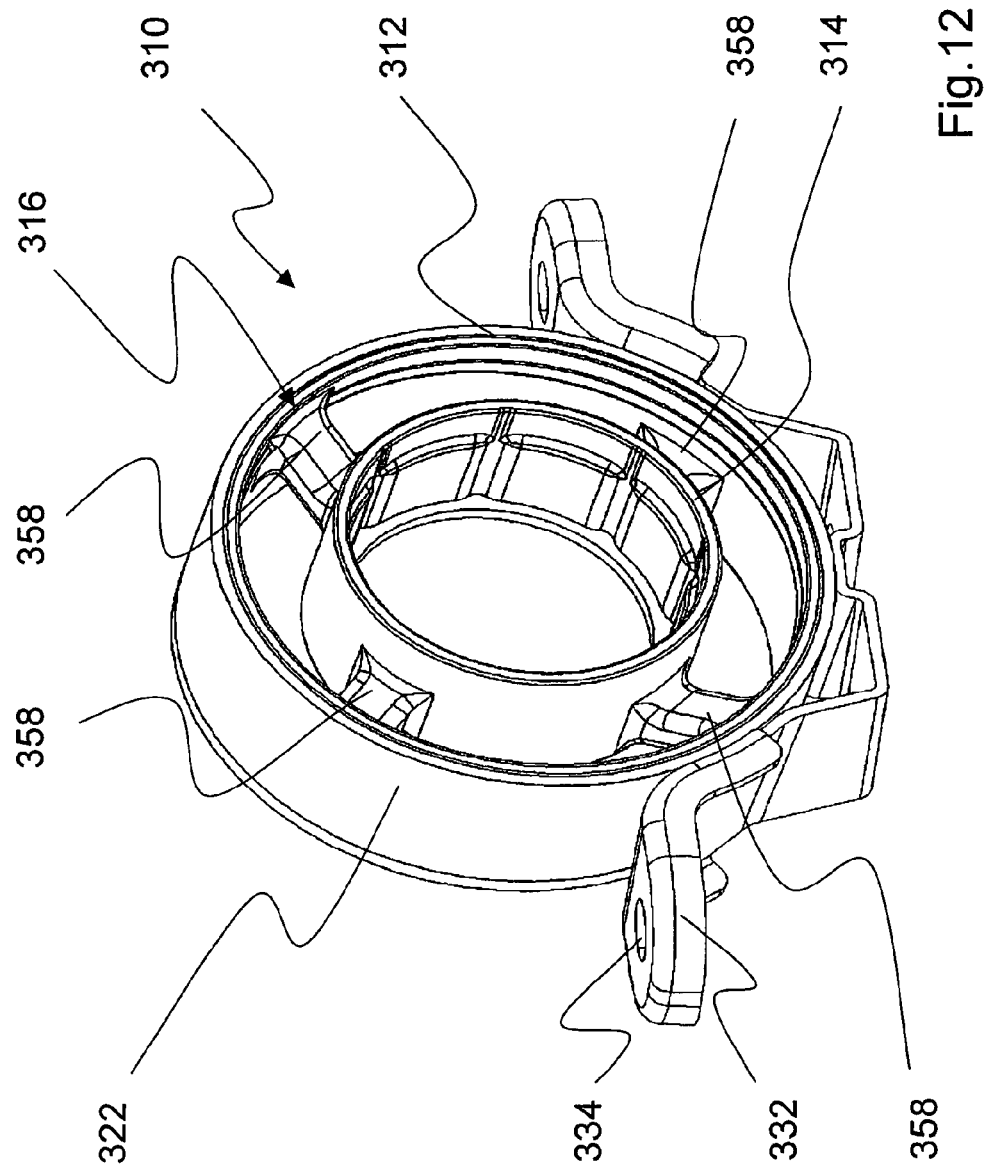
FIG. 12 shows a perspective view of a fourth embodiment of the invention.

As can be seen from FIG. 12, the radial inner support ring 314 is connected with the radial outer support ring 312 via deformable connecting webs 358 and, contrary to the first two embodiments, is no longer connected with a closed circumferential connecting body. FIG. 12 also shows that the connecting webs 358 limit the axial deflections by virtue of their deformability alone, i. e. without the arrangement of additional features. According to this embodiment, the bearing housing 322 consists of one ring only which is in engagement with the radial outer support ring 312.

In order to achieve the same properties as in the above described embodiments, the connecting webs 358 are arranged obliquely to the central axis (not shown) of the shaft bearing and preferably arranged in regular radial angular distances. In order to compensate the additionally occurring tensile and shear stresses of this embodiment by correspondingly counteracting forces, the connection webs 358 are inclined in different axial directions of the shaft bearing, whereby the numbers of connecting webs 358 which are inclined in both axial directions should be identical. The desired radial and axial properties may be set via the number of webs 358, the angular offset or the lopsided arrangement, respectively, and the cross-section of the webs 358.

Figure 13:
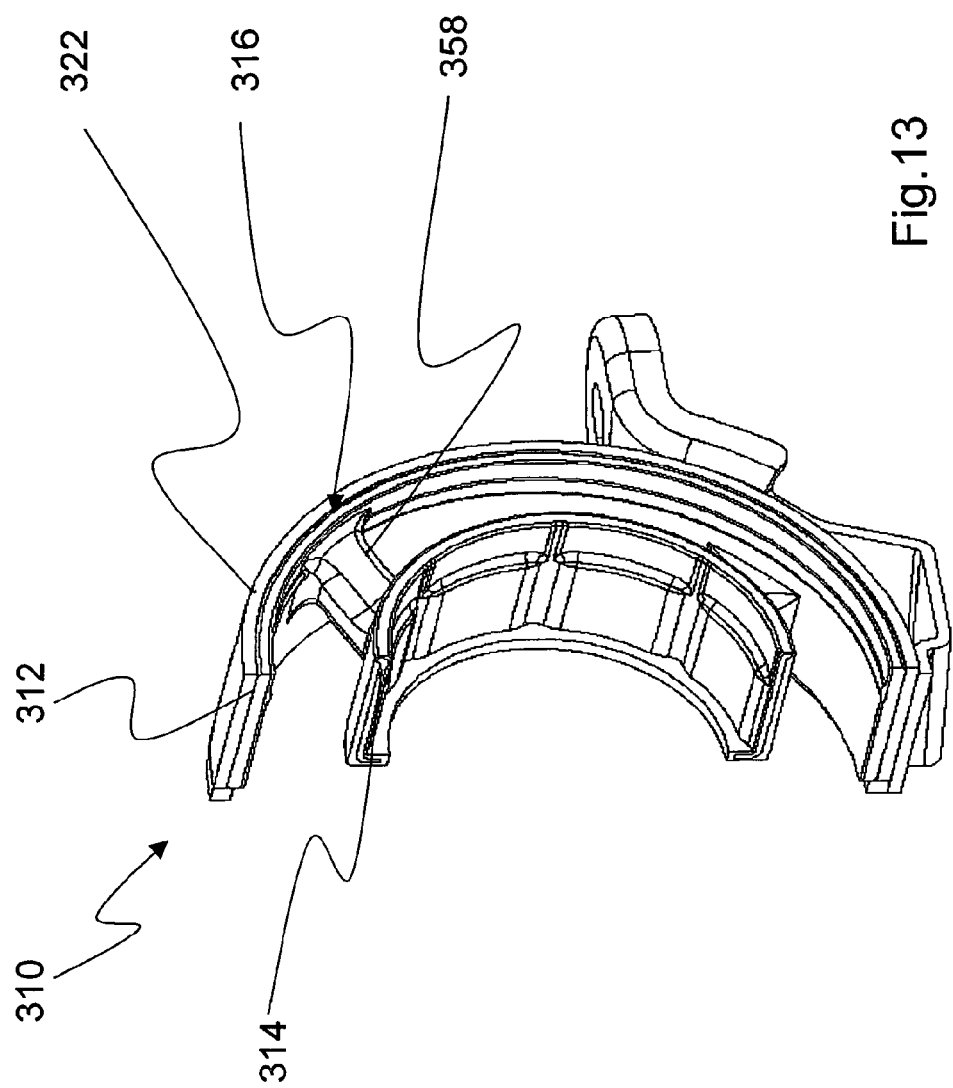
FIG. 13 shows a perspective sectional view which is sectioned in the plane containing the axis of the fourth embodiment of the invention.

FIG. 13 shows a sectional perspective view of the third embodiment, which shows more clearly that the connecting web 358 is arranged askew between the radial outer support ring 312 and the radial inner support ring 314.

Figure 14:
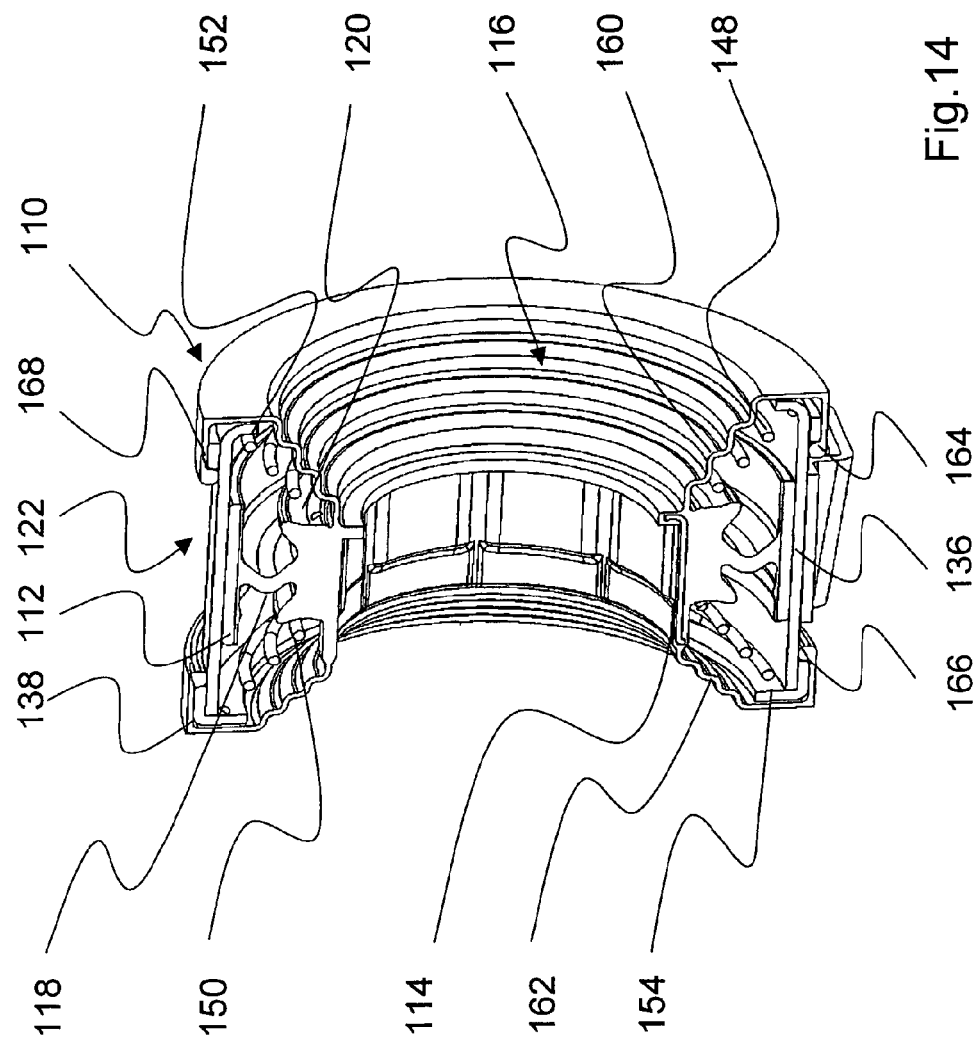
FIG. 14 shows a perspective sectional view which is sectioned in the plane containing the axis of the second embodiment of the invention with rubber sleeves.

FIG. 14 shows another variant of the second embodiment of the invention. Therefore, identical reference numerals are used for components with the same effect or with similar configurations as with respect to FIGS. 8 and 9.

As can be seen from FIG. 14, the springs 148, 152 may be surrounded by bellow-like rubber diaphragms or rubber sleeves 160 and 162 which are formed on the connecting body 116 or installed on the radial inner support ring, in order to protectively envelop them against the environment, i. e. to protect them against contamination. For this purpose, the sleeves 160, 162 may be tightly fixed on the outer ring in a positive or non-positive manner. In FIG. 14, the rubber sleeve 162 surrounds the removable housing end part 138 and contacts the housing part 136 with its thickened end 162 behind the housing end part 138. In a similar manner, the rubber sleeve 160 with its thickened end 164 comes into contact behind a circumferential ring 168 which is arranged on the housing part 136, or with a groove which is provided for this purpose.

In FIG. 14 is can also be seen that the springs 148, 150 bear against the connecting body 116. Alternatively, it may be provided for the springs 148, 150 to directly bear against a surface of the radial inner support ring 114.

What is claimed is:

1. A support arrangement adapted for the yielding support of a shaft bearing, the support arrangement comprising:
   a radial inner support ring,
   a bearing housing for fixing the support arrangement to a vehicle, wherein the radial inner support ring is connected with the bearing housing via a connecting structure in such a manner that the radial inner support ring is deflectable from an initial position relative to the bearing housing with respect to a central axis of the shaft bearing both in an axial direction and a radial direction, and
   stop portions protruding from the bearing housing toward the central axis on each side of the bearing housing, the stop portions spaced axially from and positioned axially outside of the connecting structure when the radial inner support ring is in the initial position, wherein the stop portions contact at least the connecting structure to limit an axial deflection of the radial inner support ring when the radial inner support ring is axially deflected, wherein the stop portions on each side of the bearing housing are circumferentially disposed and spaced equally apart,
   wherein at least one stop surface is formed on a connecting body of the connecting structure, the at least one stop surface positioned to contact the stop portions of the bearing housing when the radial inner support ring is axially deflected, and wherein the at least one stop surface of the connecting body may be configured as a complete circumferential surface.

2. A support arrangement adapted for the yielding support of a shaft bearing, the support arrangement comprising:
   a radial inner support ring,
   a bearing housing for fixing the support arrangement to a vehicle, wherein the radial inner support ring is connected with the bearing housing via a connecting structure in such a manner that the radial inner support ring is deflectable from an initial position relative to the bearing housing with respect to a central axis of the shaft bearing both in an axial direction and a radial direction, and
   stop portions protruding from the bearing housing toward the central axis on each side of the bearing housing, the stop portions spaced axially from and positioned axially outside of the connecting structure when the radial inner support ring is in the initial position, wherein the stop portions contact at least the connecting structure to limit an axial deflection of the radial inner support ring when the radial inner support ring is axially deflected, wherein the stop portions on each side of the bearing housing are circumferentially disposed and spaced equally apart.

3. The support arrangement of claim 2, wherein the connecting structure comprises a connecting body made from an elastic material, which radially and axially connects the radial inner support ring with an outer support ring so as to be elastically deflectable.

4. The support arrangement of claim 3, wherein at least one stop surface is formed on the connecting body, the at least one stop surface positioned to contact the stop portions of the bearing housing when the radial inner support ring is axially deflected.

5. The support arrangement of claim 4, wherein the at least one stop surface of the connecting body may be configured as a complete circumferential surface.

6. The support arrangement of claim 5, wherein the at least one stop surface is aligned with corresponding radial protrusions of the bearing housing defined by the stop portions.

7. A drive train for a vehicle, comprising:
   the support arrangement of claim 2.

* * * * *